Nov. 19, 1968  J. ARASIM, JR  3,411,362
DIRECT DRIVE PRESSURE TRANSDUCER

Filed Dec. 20, 1965

INVENTOR
JOHN ARASIM, JR.

BY Beaman & Beaman

ATTORNEYS

INVENTOR
JOHN ARASIM, JR.
BY Beaman & Beaman
ATTORNEYS

United States Patent Office 3,411,362
Patented Nov. 19, 1968

3,411,362
DIRECT DRIVE PRESSURE TRANSDUCER
John Arasim, Jr., Albuquerque, N. Mex., assignor to Sparton Corporation, Jackson, Mich., a corporation of Ohio
Filed Dec. 20, 1965, Ser. No. 514,794
9 Claims. (Cl. 73—398)

ABSTRACT OF THE DISCLOSURE

An electromechanical transducer for converting pressure into electrical signals comprising a rotatably mounted twisted Bourdon tube adapted to directly drive a wiper arm cooperating with a potentiometer to provide for a high resolution, low hysteresis instrument.

---

The instant invention relates to a measuring system, and particularly to a transducer which produces an output electrical signal of a magnitude proportional to a physical stimulus, such as a force or pressure, or other such physical conditions that can be expressed in terms of a pressure. More particularly, the invention relates to transducer systems for converting pressure into electrical signals for the purpose of measuring the pressure, with the electrical signal being conveniently an impedance, a voltage, a current or a variation of time function of these parameters, as a function of the applied pressure, or to some function of the applied pressure.

Ideally, the electrical output signal of such a system is proportional to pressure changes, but a large number of factors prevent and limit the output from corresponding to the ideal, particularly under severe operating conditions. In other words, the ideal transduced system output for X pressure would be exactly Y volts, for 10X p.s.i. input the output signal would be exactly 10Y volts, and for each intermediate pressure the voltage would be in exact ratio to the input pressure. Hence, for the ideal system, $$y = mx + b$$

with $b \cong o$. The instant invention provides for a direct drive transducer system which closely approaches the ideal.

For ease of measuring various kinds of forces as well as for ease of handling the output data for control purposes, it has been found desirable to convert the applied force to an electrical signal. The forces being measured can be those created by the pressure of a weight, the pressure of differential pressures of a fluid or gas, or indeed the forces created by the acceleration of a mass. It is also desirable that the devices for measuring such forces and converting measurements into electrical signals be compact and as lightweight as possible, particularly for airborne and aerospace applications where weight and space considerations are critical.

The demands of the aerospace environments have provided a new order of requirements and design sophistication heretofore unknown in the transducer industry. Present day requirements, in pressure transducers include not only miniaturization, with some relaxation in tolerances to achieve necessary size, but have stimulated a need for the utilization of internally supplied secondary forces such as servo mechanisms to supplement the force applied externally against the displaced member, usually a diaphragm capsule or Bourdon tube. This additional mechanism, of course, results in increased size and weight. Such inconsistencies in design requirements manifest themselves in the realization within the transducer industry that there is no one single instrument or single transducer type which will satisfy all the needs of the aerospace and industrial process industries. It is now realized that for most sets of pressure measurement demands there is an optimum transducer design which will satisfy the desired relationship between performance, size-weight, and cost. In situations where severe operating conditions must be tolerated, transducer designs heretofore have been inadequate.

The transducer system of the instant invention is an improvement over such designs of the prior art and is based on a simple, mechanically sophisticated design which employs a high precision twisted Bourdon tube as the force summing member. This force summing member moves in response to applied pressure and in turn causes a sliding contact member to rotationally move over an electrical resistance element, thereby providing a voltage output signal as a function of input pressure. Prior art transducers typically employ a capsule or bellows as the force summing member, with some higher pressure designs being based on the helical, spiral, C-shaped or twisted Bourdon tubes. The twisted Bourdon tube transducers have been heretofore inferior in their inability to exhibit precise linear outputs of sufficient magnitude in response to pressure variations without complicated electronic circuitry or large mechanical amplification systems.

It is, accordingly, an object of this invention to overcome the foregoing limitations and to provide a novel transducer system for directly converting a physical force to an electrical signal.

It is a further object of the present invention to provide a novel transducer for use in measuring pressure, pressure differentials, or a physical condition that can be expressed in terms of a pressure.

It is a still further object of the invention to provide a novel transducer having a displacement member operational with minimum hysteresis, even with overloads, and whose rotational motion is translated directly and simply to rotational wiper arm movement over a resistance element.

Another object of the instant invention is to provide a sealed pressure to electrical transduced system which is characterized by high pressure-sensitivity, high resistance to acceleration forces, having virtually no temperature sensitivity, and having a high natural frequency.

Another object of the invention is to provide a high performance, low weight, miniature, direct rotational drive transducer for aerospace and severe environment industrial applications.

A particular object of the invention is to provide a pressure to electrical tranducer which directly transmits, in response to applied pressure, angular motion of a twisted Bourdon tube to rotational movement of a multi-layered potentiometer wiper over a high resolution, long operating life resistance element.

Another particular object of the instant invention is to provide an inexpensive, self-contained, rugged, direct drive pressure transducer which is characterized by high accuracy, repeatability, ease of calibration, and mechanical simplicity.

The direct drive potentiometric pressure to electric transducer system of this invention and its manner of construction, assembly, and use can be more clearly understood from the following detailed description, taken in conjunction with the accompanying drawings, in which.

Figure 1:
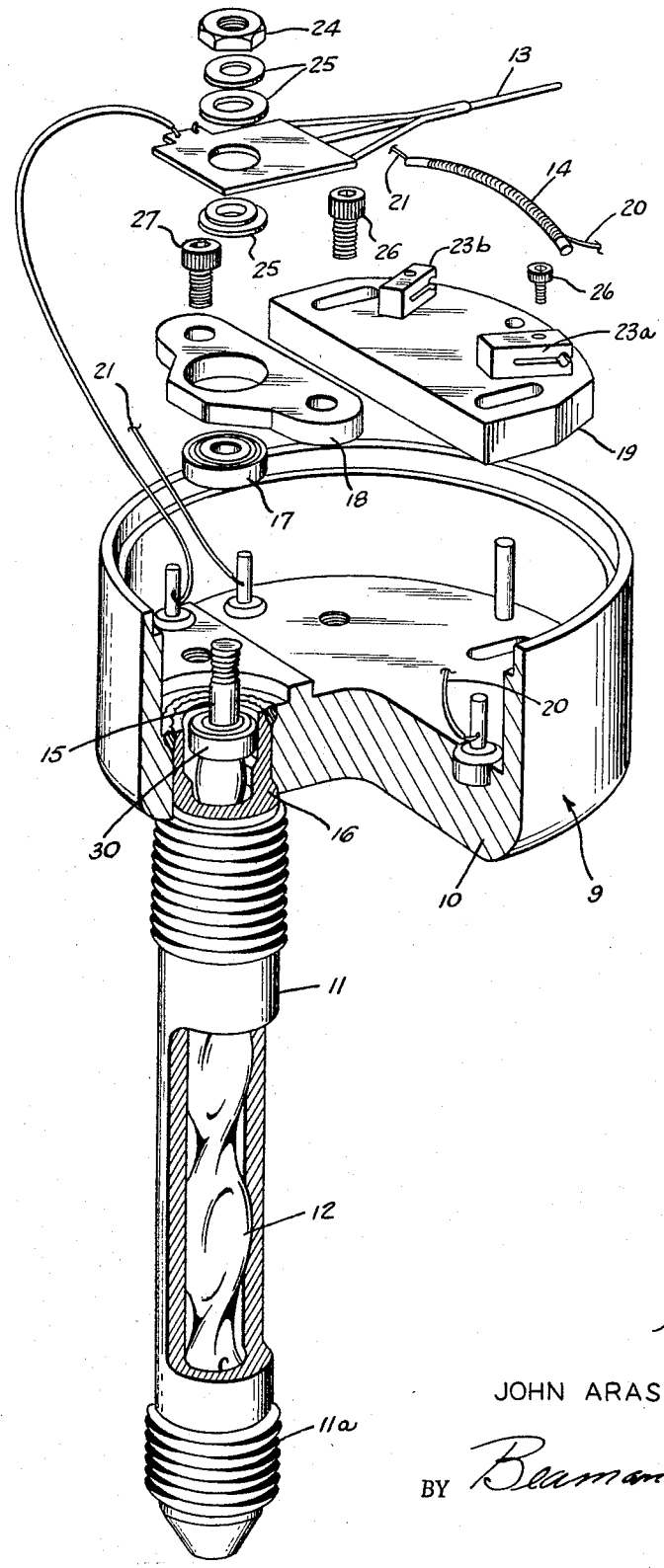
FIGURE 1 is an exploded view having a cross sectional portion of the transducer of this invention.
Figures 2, 3:
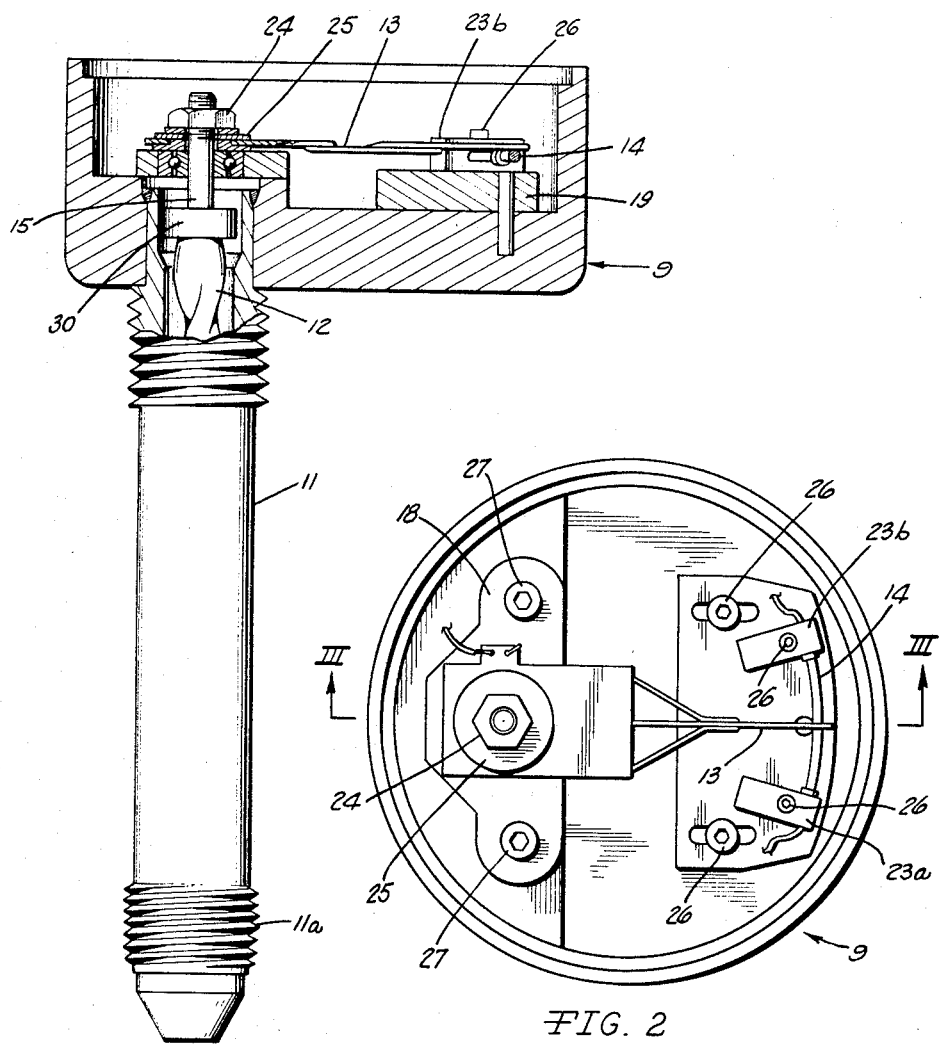
FIGURE 2 is an end view having the cover removed to expose the directly driven potentiometric assembly including a wiper arm and resistance element.
FIGURE 3 is a view taken along lines III—III of FIGURE 2, partially cut away.

Referring now to the drawings, in which like refernce numerals denote like elements in all drawings hereof, in the present preferred embodiment of the invention a pressure transducer is generally in FIG. 1 and FIG. 3 indicated at 9 having a tubular male coupling member 11 with external threads at 11a for connection to an external pressure source.

Variations in pressure, constituting an input signal from an external source, are admitted through the metal tubular inlet portion at 11a of FIG. 1 and FIG. 3 into the precision twisted Bourdon tube 12 which is secured and hermetically sealed at its pressure inlet portion to the interior wall of tubular member 11, said secured inlet portion of tube 12 being located at threaded portion 11a, the opposed free end of tube 12 having seal means 30, and cause the tube 12 to twist, responsive to such pressure input signals, about its longitudinal axis. This rotational movement, caused by the differential pressures within tube 12 and the pressure within the walls of tubular member 11, is transferred directly to the flexible wiper arm 13, causing the arm to move in an arc across resistance member 14 through a simple, dynamically balanced, and direct motion transmitting means consisting of a threaded shaft 15 rotatably mounted on bearings 17 mounted and sealed at 16 with supporting plate 18, screws 27, to the main body 10 portion. The threaded shaft 15 is designed to cooperate with washers 25, functioning also as mechanical seals, and with nut 24 to provide a direct wiper arm connection to the twisted tube 12. In the interests of providing greater arm 13 travel, the pressure summing assembly contained by tubular member 11 is located at the peripheral portion of the circular housing 10 base.

Resistance element 14, as illustrated in FIG. 1, FIG. 2 and FIG. 3, is desirably a wire wound member but may be suitably a self supporting dielectric material coated with a a thin resistive layer such as a metal, carbon, conductive plastic, or the like, and is adjustably mounted to the housing 10 through support 19 and sliding blocks 23a and 23b and screws 26. If a wire is used, 200 to 800 turns of platinum alloy wire of 0.5 to 2 mils thickness, are wound around the dielectric mandrel, which can be suitably a ceramic, phenolic, Micarta, with the mandrel material being selected to match the temperature coefficients of wire expansion. Desirably the resistance element 14 can be a conductive plastic to improve resolution and to provide for a low sliding coefficient of friction between wiper arm 13, and additionally to provide for increased wiper pressure and longer potentiometric assembly operating life. Also useful for the pot element 14 is a metallic dispersion in a vitreous binder (Cermet). Deposited or chemically treated metallic film can also be used as the resistance material over the insulating mandrel, with conducting patterns for commutation and circuit development being additionally provided by film deposition to achieve direct electrical functionality employing the output signal from resistance 14 as a source along with a power supply, and other active and passive circuit elements desirably located within housing 10. A useful commutator and sensor for rotary shaft position and motion sensing, functioning in lieu of pot 14 and arm 13 with input and output means, can be suitably a modified solid state commutator such as described in Electronic Design, July 17, 1965, pp. 20–23.

Figure 4:
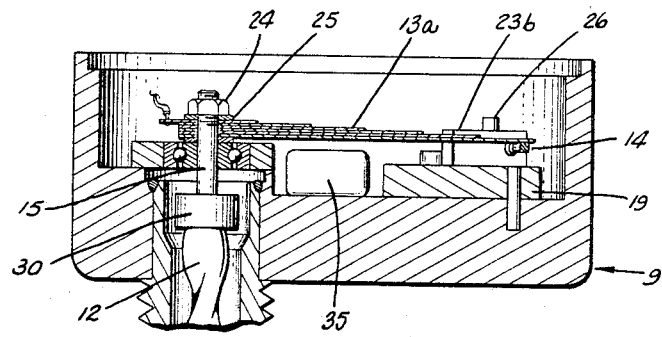
FIGURE 4 is a fragmentary section taken substantially along IV—IV of FIGURE 5.
Figure 5:
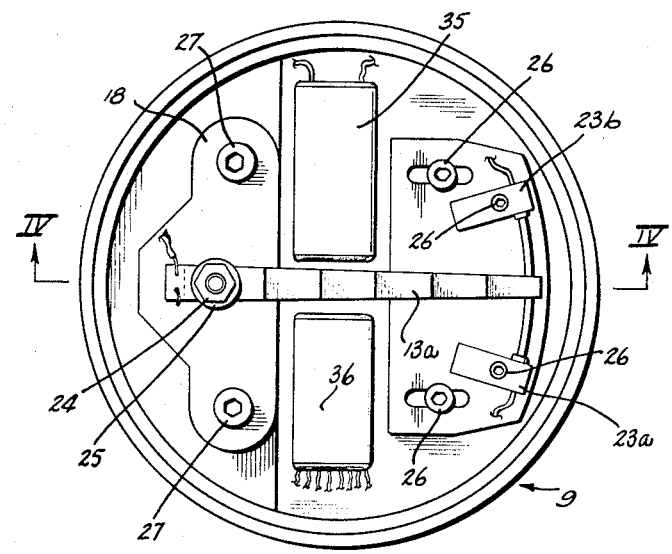
FIGURE 5 is an alternate top plan view of a self-contained transducer system.

The hollow twisted tube 12 is of precise design and desirably composed of a corrosion resistant metal which also exhibits small hysteresis error and temperature insensitivity, such as commercial alloy Ni-Span-C, and in some cases copper based alloys, stainless steels and nickel based alloys, and is secured to tubular member 11 near to the pressure inlet portion thereof to provide for direct communication between the tube 12 interior and external pressure signals. This arrangement thus provides for direct transmission of tube 12 torque into radial movement of the wiper arm 13 across the resistance member 14, with arm 13 having a slight contact pressure to minimize lift-off and lateral excursions under shock and severe vibration which can result in noise spikes and spurious output signals at conductors 20 and 21. Further minimizing of noise is suitably obtained by employing a double wiper construction with one contact being disposed below and one contact disposed above member 14, or by providing a wiper shape with protrusions resonating at different frequencies. Another desirable wiper arm configuration is a multi-layered composite assembly made from bound variable length metal leafs, each leaf having a different natural frequency, said bound portion being located at the rotating shaft 15 end thereof. A multi-layered wiper arm 13a is conveniently shown in FIG. 4 and in FIG. 5 wherein is also illustrated a completely functional transducer system including power source 35 and sealed microcircuit package 36 suitably connected thereto.

In the operation of the transducer, it will be noted, the free end of the twisted Bourdon tube rotates in an amount proportional to the difference in pressure within the tubular housing means and the space within the tube itself. This torque is then directly transmitted to the potentiometric assembly to provide an electric output voltage without the use of reluctance, magnetic, or other electronic circuitry. It is noted that a dynamic differential pressure transducer system can be constructed by the installation of ports in the walls of tubular member 11 to provide for fluid pressure within said tubular member 11 which acts on the outside of twisted tube 12. This space can be conveniently evacuated to produce an absolute measuring system.

It may also be desirable to incorporate within the transducer housing active electronic elements to amplify, digitize, or otherwise provide for the desired system electrical output. These elements may be conveniently in modular packaged form such as integrated semiconductor circuits or other such functional elements with a micro-miniaturized power source also sharing the same housing and thus providing for a self contained totally enclosed pressure to electric, functional transducer system as in FIG. 5. The advantages of this self contained functional system, with its low power requirements, and inherent accuracy and simplicity, make it particularly useful in space and aerospace environments. Angular shaft 15 motion detection and position indicating means can be alternately provided by associated sampling and commutation circuitry including the solid state commutator disc assembly in combination with selected logic modules for position read out.

It is therefore obvious to those skilled in the art that modifications and variations of the inventive concept hereof can be made without departing from the basic content and invention hereof. It may be also seen that the objects set forth hereinabove, among those made apparent from the detailed drawings and description hereof, are efficiently realized, and since certain changes may be made in the above constructions without departing from the concept and inventive scope hereof, it is intended that all matter contained in the aforegoing drawings and description shall be interpreted as illustrative and not in a limiting sense.

The invention claimed is:

1. A transducer for translating pressure variations into electrical signals comprising, in combination,
   (a) support means defining a first cavity,
   (b) pressure summing means disposed within said first cavity and having one end thereof rotatably mounted therein,
   (c) a housing secured to said support means, and means for sealing said housing with respect to said support means,
   (d) potentiometric means connected directly to said pressure summing means and disposed with said housing.

2. In a transducer for translating pressure variations into electrical signals as defined by claim 1 wherein:
(a) said pressure summing means is a twisted Bourdon tube.

3. An electromechanical system for producing an electrical signal in response to pressure variations, as defined in claim 1 wherein:
(a) said potentiometric means comprises a conductive plastic resistance element.

4. An electromechanical system for producing an electrical signal in response to pressure variations, as defined in claim 1 wherein:
(a) an electrical supply circuit is contained within said housing.

5. Pressure responsive apparatus comprising, in combination,
(a) pressure summing means,
(b) tubular pressure inlet means surrounding and secured to said pressure summing means,
(c) housing means secured to said tubular means, and means for sealing said housing means with respect to said tubular means,
(d) said housing means cooperating with said tubular means to receive shaft means connected to said pressure summing means,
(e) wiper means secured to said shaft means,
(f) electrical resistance means, said electrical resistance means and wiper means located in said housing,
(g) electrical circuit means connecting said wiper and resistance means to input and output electrical contact means.

6. In a pressure responsive apparatus as defined by claim 5 wherein:
(a) said wiper means comprises variable length metal strips bound as a multi-layered flexible member at the shaft means end and connected thereto.

7. In a pressure responsive apparatus, as defined by claim 5 wherein:
(a) said electrical circuit means includes active and passive electronic elements contained within said housing.

8. In a pressure responsive apparatus as defined by claim 5 wherein:
(a) said pressure summing means comprises a twisted Bourdon tube.

9. A pressure to electric transducer system comprising, in combination,
(a) an electrical supply circuit,
(b) a housing,
(c) support means secured to said housing, and means for sealing said housing with respect to said support means,
(d) pressure responsive means having one end thereof rotatably mounted in said support means,
(e) rotary position and motion sensing means disposed within said housing and in electrical communication with said pressure responsive means,
(f) electrical circuit means connecting said rotary position and motion sensing means to said electrical supply circuit and to electrical output means.

References Cited

UNITED STATES PATENTS

| | | | |
|---|---|---|---|
| 2,877,326 | 3/1959 | Bourns | 73—418 XR |
| 2,885,519 | 5/1959 | Louis et al. | 338—202 |
| 3,266,004 | 8/1966 | Fox et al. | 338—174 |
| 3,280,632 | 10/1966 | Harland et al. | 73—418 |

S. CLEMENT SWISHER, *Acting Primary Examiner.*

DONALD O. WOODIEL, *Assistant Examiner.*